March 3, 1964     C. H. IDEN     3,122,861
FIELD REPLACEMENT OF BLOCK IN MASONRY WALLS AND PANELS
Filed May 25, 1960     4 Sheets-Sheet 1

INVENTOR.
CHARLES H. IDEN
BY
ATTORNEYS

March 3, 1964  C. H. IDEN  3,122,861
FIELD REPLACEMENT OF BLOCK IN MASONRY WALLS AND PANELS
Filed May 25, 1960  4 Sheets-Sheet 2
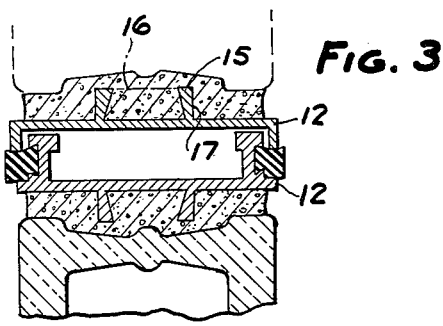
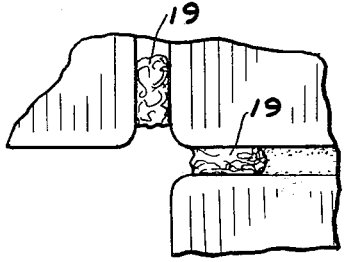
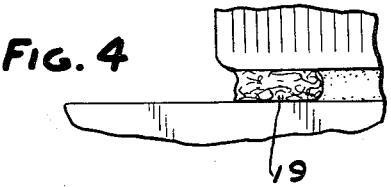
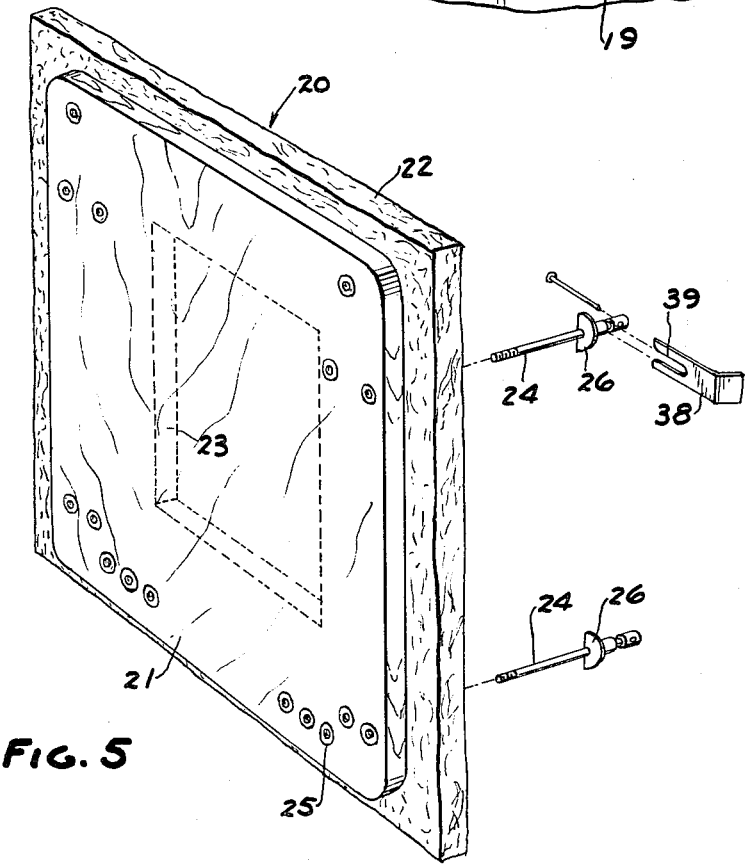
INVENTOR.
CHARLES H. IDEN
BY
ATTORNEYS March 3, 1964 C. H. IDEN 3,122,861
FIELD REPLACEMENT OF BLOCK IN MASONRY WALLS AND PANELS
Filed May 25, 1960 4 Sheets-Sheet 3

INVENTOR:
CHARLES H. IDEN
BY W. A. Schaich &
E. J. Holler
ATTORNEYS

United States Patent Office 3,122,861
Patented Mar. 3, 1964

3,122,861
FIELD REPLACEMENT OF BLOCK IN MASONRY
WALLS AND PANELS
Charles H. Iden, Muncie, Ind., assignor, by mesne assignments, to Owens-Illinois Glass Company, Toledo, Ohio, a corporation of Ohio
Filed May 25, 1960, Ser. No. 31,722
2 Claims. (Cl. 50—533)

This invention relates to the replacement of broken blocks in masonry walls and panels and particularly to the replacement of a glass block in a masonry wall of glass block.

It is common practice in building construction to make walls of glass block or similar block materials. Such walls are conventionally assembled by using a bonding material such as mortar to build up the wall in place in the building. Alternatively, prefabricated panels of block utilizing a frame and the bonding material such as mortar are assembled and transported to the building site in order to form the wall.

In the course of use of a building having such walls, it is not uncommon to have a block broken. Heretofore the replacement of such a block has required a great deal of time and skill.

It is an object of this invention to provide a method and apparatus for replacing a block such as a glass block in a wall which has been previously placed in position.

It is a further object of this invention to provide such a method and apparatus which requires a minimum amount of skill.

It is a further object of the invention to provide such an apparatus which can be readily adapted to blocks of different sizes and in different locations.

It is a further object of the invention to provide such an apparatus which is relatively low in cost.

Basically, the method comprises removing the broken parts of the block which is to be replaced and the mortar or other bonding material which held the block in position, thereby forming an opening which is adapted to receive the new block. A work panel having a resilient surface is then brought into position adjacent one side of the opening engaging the surrounding portions of the wall. The block is then inserted in the opening and another work panel having a resilient surface is brought into position against the periphery of the other side of the opening. The resilient material of the panels seals the spaces between the edge of the replacement block and the surrounding portions of the wall. Bonding material such as mortar is then poured into these spaces and permitted to set after which the panels are removed. Bolts are secured to one of the panels and have portions that are adapted to engage the portions of the wall surrounding the opening to support the panel in position. The second panel is also mounted on these bolts. After the bonding material is set, the bolts are removed permitting the panels to be removed from the sides of the wall. The holes left by the bolts are filled with caulking material to complete the replacement.

In the drawings:

FIG. 3 is a fragmentary sectional view taken along the line 3—3 in FIG. 2.

FIG. 4 is a fragmentary elevational view of a portion of the wall showing the manner in which the corners of the opening are prepared for insertion of the replacement block.

FIG. 5 is an exploded perspective view of a panel used on the exterior of the wall.

Figure 1:
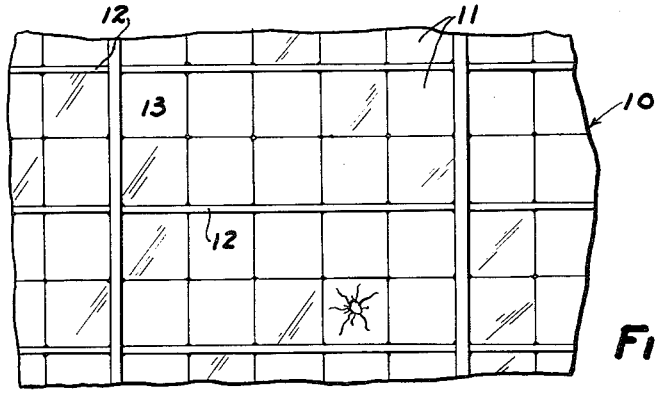
FIG. 1 is a fragmentary elevational view of a wall incorporating a broken block.
Figure 2:
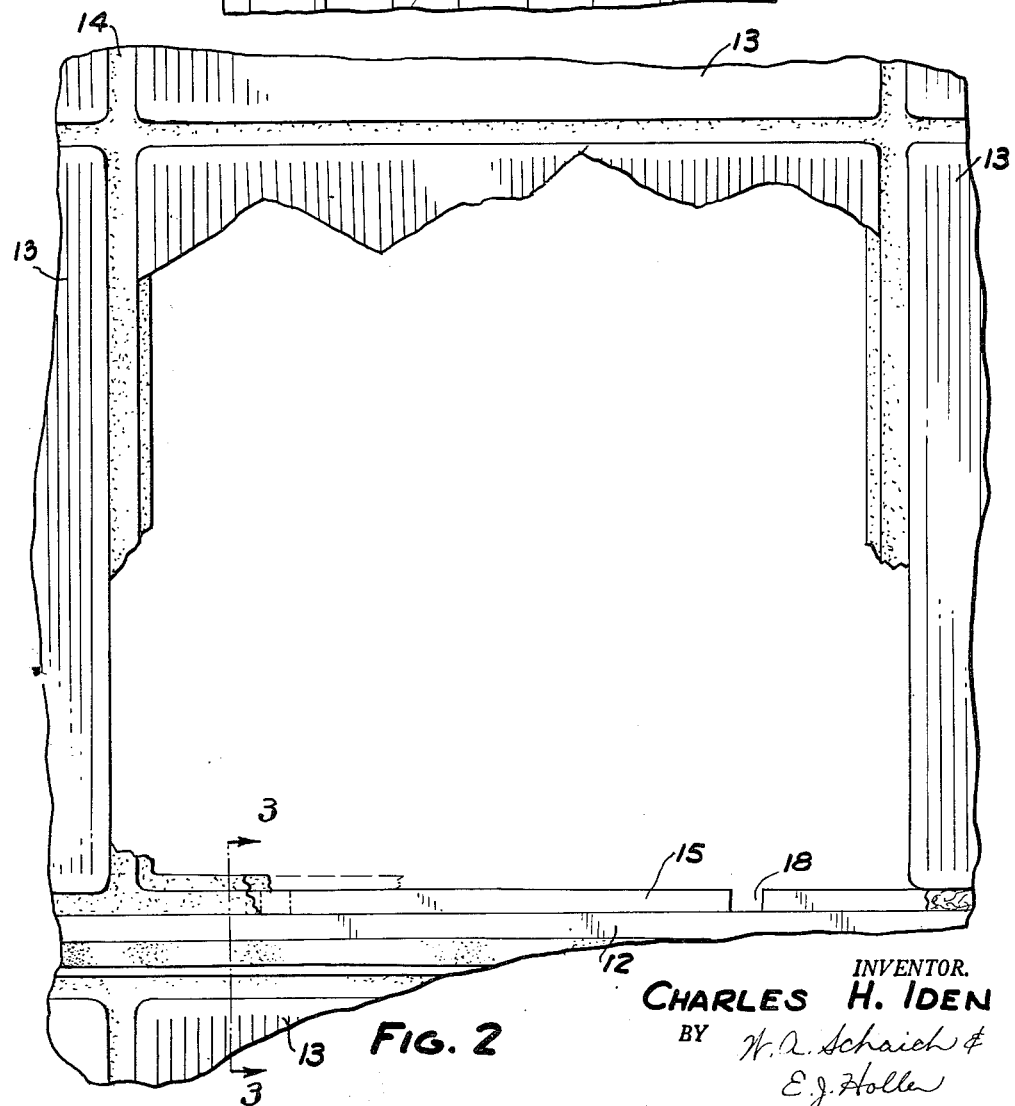
FIG. 2 is a fragmentary elevation on an enlarged scale of the portion of the wall shown in FIG. 1 which incorporates the broken block showing the manner in which the opening is prepared in the initial steps of replacement of the block.

Referring to FIG. 1, the wall 10 is made of prefabricated panels 11 that are mounted in a frame made up of vertical struts. Each panel 11 includes a rectangular frame 12 containing a plurality of glass blocks 13 mounted in the frame by a bonding material such as mortar 14 (FIG. 2). The blocks are of conventional construction and comprise parallel spaced side walls connected by end walls.

If one of the blocks is broken, as shown in FIG. 1, and it is desired to replace the block, the opening for the replacement block is prepared by breaking out all portions of the broken block, care being exercised not to break any portion of the adjacent blocks. Then the mortar 14 which held the broken block in position is removed by chipping and prying, for example, with a screw driver. Where the frame 12 is adjacent one portion of the periphery of the broken block and where it has inwardly extending ribs or flanges 15, as shown in FIG. 3, the mortar is chipped and filed away to the top surface of the ribs 15 as shown by broken line 16 and the mortar is broken away to the outer edges 17 of the ribs 15. In addition, where such ribs 15 are present, notches 18 are formed at predetermined points therein extending axially of the opening to permit bolts to pass therethrough as presently described (FIG. 2).

The corners of the joints are then packed and filled with a soft deformable material that is water permeable, such as wood pulp mat, as shown at 19 in FIG. 4. This is to prevent the bonding material from flowing into the grooves of the adjacent joints.

The opening thereby formed is now ready for mounting a portion of the assembly prior to insertion of the replacement block.

As shown in FIG. 5, the pouring assembly includes an outer panel 20 that comprises a flat rectangular board 21 of wood or similar material having a generally uniformly thick pad 22 of soft non-porous deformable material such as foam rubber adhered to one surface thereof by adhesive. The central portion of the pad 22 is cut away to form an opening 23 that is rectangular in cross section. The outer panel 20 is adapted to be brought into contact with the outer surface of the wall with the pad 22 engaging the periphery of the opening that is formed by breaking away the broken block. Retaining bolts 24 are adapted to extend through pad 22 and are threaded into sheet metal nuts 25 embedded in the board 21. A plurlity of sheet metal nuts 25 are provided at predetermined points in order that the panel 20 may be used for different sizes of block. As shown in FIG. 5, the periphery of pad 22 extends beyond the periphery of the block 21.

Figure 6:
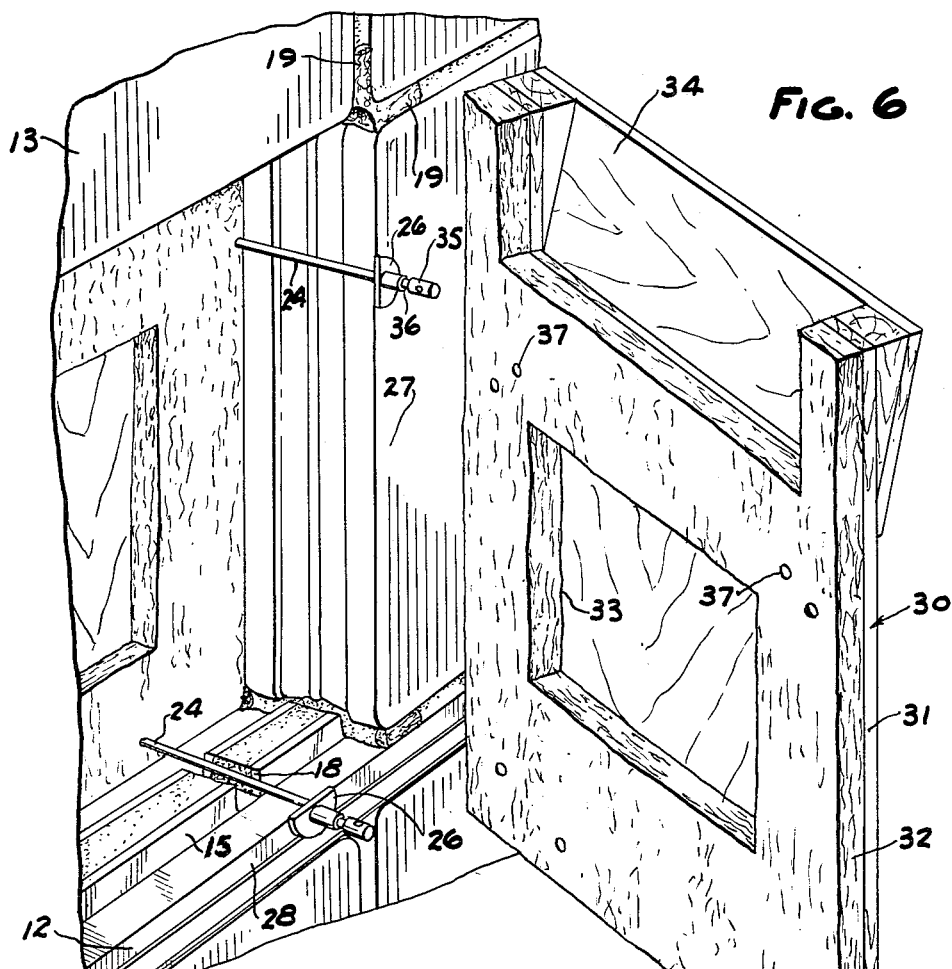
FIG. 6 is an exploded perspective view of the panels shown from the interior of the wall with the block removed.

Each bolt 24 includes a semi-circular flange 26 intermediate its ends and so positioned that when the panel 20 is brought adjacent the outer surface of the block wall and the retaining bolts 24 are rotated 180 degrees, the flange 26 engages the edge 27 of the adjacent portions of the wall as shown in FIG. 6. As further shown in FIG. 6, where the adjacent portion of the wall comprises a frame member 12, the bolt 24 passes through notch 18 that has been previously formed in the ribs 15 and mortar therebetween. The flange 26 on the latter bolt 24 engages the edges 28 of frame 12. In this fashion, the panel 20 is brought into position adjacent the outer surface of the wall with the foam rubber pad 22 engaging the periphery of the opening and sealing the periphery of the opening. The replacement block is then placed in the opening and the bolts 24 are rotated 90 degrees bringing the flange 26 into engagement with the edge of the replacement block while maintaining engagement with the edge 27 of the adjacent block thereby holding the replacement block in position.

Figure 7:
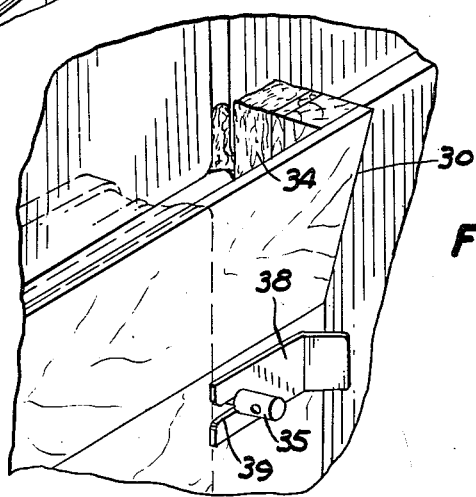
FIG. 7 is a fragmentary perspective view similar to FIG. 6 with the inner panel in position.

An inner panel 30 is then brought into position with the other side of the opening, that is, the exposed face of the replacement block. As shown in FIGS. 6 and 7, the inner panel 30 of the assembly comprises a flat rectangular board 31 of wood or similar material generally uniformly thick and a pad 32 adhered to one surface thereof. Pad 32 is made of a soft non-porous deformable material such as foam rubber. As shown in FIG. 6, the central portion of the pad 32 is cut away as at 33 leaving a peripheral portion that is adapted to engage the sides of the opening and seal the same. The upper portion of the block 31 and the pad 32 are cut away and a funnel 34 is formed to permit the entry of the bonding material as presently described.

As shown in FIGS. 6 and 7 the portion of the bolt 24 which extends from the flange 26 is enlarged in diameter as shown at 35 and includes a peripheral groove 36 therein. This portion 35 extends through holes 37 in the panel 30. The panel 30 is then pressed against the wall compressing the pad 32 and clips 38 having slots 39 are engaged with the groves 36 on the bolts 24 to lock and hold the inner panel 30 in position with the pad 32 sealing the ends of the spaces between the replacement block and the wall.

Figure 8:
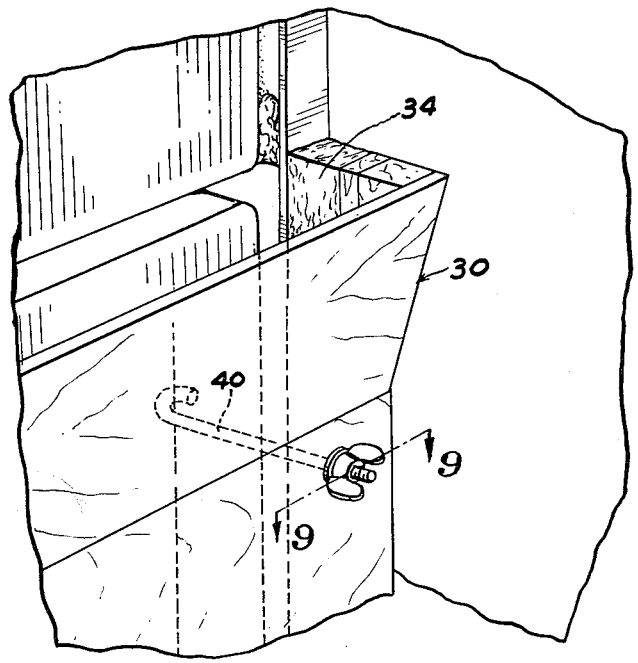
FIG. 8 is a fragmentary perspective view similar to FIG. 7 showing the arrangement used in connection with the block at a corner or along a frame member.
Figure 9:
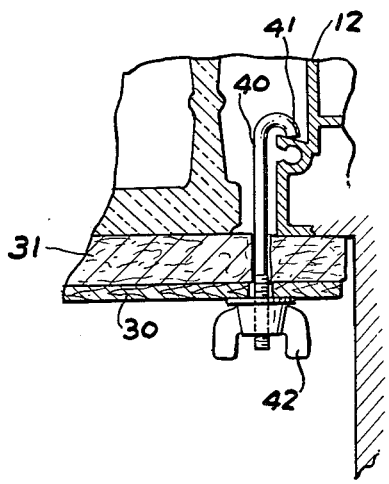
FIG. 9 is a fragmentary sectional view taken along the line 9—9 in FIG. 8.

A quick-setting water-containing mortar is then poured in through the funnel 34 filling the spaces between the periphery of the replacement block and the sides of the opening. After the mortar is set, the inner panel 30 is removed by the removing of clips 39 and pulling the panel 30 off, the bolts 24 are then removed by unscrewing them from engagement with the outer panel 20 leaving the panel 20 so that it falls to the floor or ground. Alternatively, the panel 20 may be suspended by a cord so that it will not fall but can be pulled upwardly to the roof of the building.

Where the periphery of the opening does not permit the passage of the bolts 24 through to the outer panel 20, hooks 40 as shown in FIGS. 8 and 9 may be used having ends 41 that engage portions of the frame 12 of the wall with the threaded portion of the hook 40 extending through the outer panel 30 and wing nuts 42 threaded thereon. In this fashion, the inner panel 30 is firmly held against the periphery of the opening in the wall.

After the panels 30 are removed the holes through which the bolts 24 have passed are filled with caulking material and the joints are routed where needed. The caulking of joints is usually needed only in the upper horizontal portion of the joint between the top of the replacement block and the bottom of the block defining the opening.

It can thus be seen that in accordance with the above described method and apparatus the problem of replacing a block is substantially minimized and through the use of the apparatus described it is possible to replace a broken block with a minimum amount of skill.

I claim:

1. In a wall of block comprising a plurality of blocks bonded together by bonding material and having a frame member extending along at least a portion of the periphery of one of said blocks, the method of replacing a broken block which has a portion of its periphery adjacent said frame member which comprises removing all portions of the broken block and the free mortar surrounding said broken block, forming axially extending notches in the portions of said frame adjacent said block, bringing a panel having resilient material on one face thereof into contact with the periphery of said opening, positioning a replacement block in said opening, bringing another panel having resilient material on one face thereof into contact with the periphery of said block on the other side of said wall, connecting said panels by means extending through said notches in said frame member and means extending between the spaces between the periphery of said block and said sides of said opening, filling the space between the periphery of the replacement block and the sides of said opening with a bonding material, permitting the bonding material to set and thereafter removing the panels.

2. In a wall of block comprising a plurality of blocks bonded together by bonding material and having a frame member extending along at least a portion of the periphery of one of said blocks, the method of replacing a broken block which has a portion of its periphery adjacent said frame member which comprises removing all portions of the broken block and the free mortar surrounding said broken block, bringing a panel having resilient material on one face thereof into contact with the periphery of said opening, positioning a replacement block in said opening, bringing another panel having resilient material on one face thereof into contact with the periphery of said block on the other side of said wall, connecting said panels by means extending between the spaces between the periphery of said block and said sides of said opening, filling the space between the periphery of the replacement block and the sides of said opening with a bonding material, permitting the bonding material to set and thereafter removing the panels.

References Cited in the file of this patent

UNITED STATES PATENTS

| | | |
|---|---|---|
| 1,316,297 | Gold | Sept. 16, 1919 |
| 2,055,885 | Weston | Sept. 29, 1936 |
| 2,150,176 | Levy | Mar. 14, 1939 |
| 2,239,989 | Britton | Apr. 29, 1941 |
| 2,335,528 | Neils | Nov. 30, 1943 |
| 2,496,571 | Wagner | Feb. 7, 1950 |
| 2,893,235 | Goldberg | July 7, 1959 |
| 2,972,783 | Russell et al. | Feb. 28, 1961 |
| 2,997,416 | Helton | Aug. 22, 1961 |

FOREIGN PATENTS

| | | |
|---|---|---|
| 907,704 | France | July 16, 1945 |